United States Patent
Zuo et al.

(10) Patent No.: US 10,131,260 B2
(45) Date of Patent: Nov. 20, 2018

(54) ANTI-RATTLE BUMPER FOR VEHICLE ARMREST ASSEMBLY

(71) Applicant: Lear Corporation, Southfield, MI (US)

(72) Inventors: Yue Zuo, Shanghai (CN); XiaoZhong Wu, Shanghai (CN); Chaoyan Zhan, Shanghai (CN); Cheng Zhan, Shanghai (CN); Yaoju Song, Shanghai (CN); Weiping Li, Shanghai (CN)

(73) Assignee: Lear Corporation, Southfield, MI (US)

( * ) Notice: Subject to any disclaimer, the term of this patent is extended or adjusted under 35 U.S.C. 154(b) by 46 days.

(21) Appl. No.: 15/386,495

(22) Filed: Dec. 21, 2016

(65) Prior Publication Data

US 2018/0170221 A1 Jun. 21, 2018

(51) Int. Cl.
*B60N 2/75* (2018.01)
*B60N 2/90* (2018.01)

(52) U.S. Cl.
CPC ............. *B60N 2/757* (2018.02); *B60N 2/919* (2018.02)

(58) Field of Classification Search
CPC .......... B60N 2/753; B60N 2/75; B60N 2/757; B60N 2/76; A47C 7/543; A47C 7/54
USPC .............. 297/411.3, 411.32, 411.33
See application file for complete search history.

(56) References Cited

U.S. PATENT DOCUMENTS

| | | | |
|---|---|---|---|
| 3,191,995 A * | 6/1965 | Shelton | B60N 2/76 297/411.33 |
| 4,060,272 A | 11/1977 | Mori | |
| 5,117,587 A | 6/1992 | Doan | |
| 5,499,475 A | 3/1996 | Court et al. | |
| 6,533,289 B2 * | 3/2003 | Bono, Jr. | F16J 15/061 277/628 |
| 9,086,149 B2 | 7/2015 | Qiang et al. | |
| 2006/0108816 A1 * | 5/2006 | Radu | B60R 7/04 296/24.34 |
| 2006/0237985 A1 * | 10/2006 | Scheerhorn | B60R 7/04 296/37.8 |
| 2009/0174236 A1 * | 7/2009 | Lota | B60R 7/04 297/188.19 |

FOREIGN PATENT DOCUMENTS

GB                912452 A    12/1962

* cited by examiner

*Primary Examiner* — Mark R Wendell
(74) *Attorney, Agent, or Firm* — MacMillan, Sobanski & Todd, LLC

(57) ABSTRACT

A bumper for a vehicle armrest assembly includes a base that extends from a first end to a second end. The base includes a front surface. The bumper includes a stop that extends from the front surface of the base. The bumper also includes a cushion that extends from the front surface of the base. The cushion extends a greater distance from the base than the stop.

18 Claims, 4 Drawing Sheets

ANTI-RATTLE BUMPER FOR VEHICLE ARMREST ASSEMBLY

BACKGROUND OF THE INVENTION

This invention relates in general to anti-rattle bumpers for vehicle armrest assemblies. In particular, this invention relates to an improved structure for such an anti-rattle bumper that prevents a vehicle armrest assembly from rattling during operation of the vehicle.

Vehicles, such as passenger cars, typically include armrest assemblies for the comfort of vehicle occupants. Often, in vehicles with a bench-type seat, a center armrest assembly is provided that may be moved between a lowered use position and a raised storage position. When in the lowered use position, the armrest assembly is available for use by occupants on either side thereof. When in the raised storage position, the center portion of the seat is available for use. The armrest assembly is typically mounted to the seat frame for relative movement between the lowered use position and the raised storage position as desired.

It is often desirable to positively retain the armrest assembly in the raised storage position in order to prevent inadvertent movement toward the lowered use position during operation of the vehicle. To accomplish this, it is known to provide a latch to retain the armrest assembly in the raised storage position. In such instances, a mechanism may be provided to selectively release the latch and allow the armrest assembly to be moved from the raised storage position to the lowered use position when desired. However, it has been found that under certain circumstances, the latch may not hold the armrest assembly completely still during operation of the vehicle. This can result in the generation of undesirable vibrations and noise. Thus, it would be desirable to provide an improved structure for an anti-rattle bumper that prevents a vehicle armrest assembly from rattling during operation of the vehicle.

SUMMARY OF THE INVENTION

This invention relates to a bumper for a vehicle armrest assembly. The bumper includes a base that extends from a first end to a second end. The base includes a front surface. The bumper includes a stop that extends from the front surface of the base. The bumper also includes a cushion that extends from the front surface of the base. The cushion extends a greater distance from the base than the stop does.

This invention also relates to an armrest assembly. The armrest assembly includes a frame. An armrest is mounted to the frame for relative rotational movement. The armrest assembly includes a latch adapted so that when the armrest is in a latched position relative to the frame, the latch retains the armrest against movement relative to the frame. The armrest assembly also includes a bumper that engages the armrest and the frame when the armrest is in the latched position. The bumper includes a stop that limits rotation of the armrest in an upwardly direction relative to the frame. The bumper also includes a cushion that biases the armrest in a downwardly direction relative to the frame.

This invention further relates to an armrest assembly. The armrest assembly includes a frame. An armrest is mounted to the frame for relative rotational movement. A latch is adapted so that when the armrest is in a latched position relative to the frame, the latch retains the armrest against movement relative to the frame. The armrest assembly also includes a bumper mounted on the frame. The bumper engages the armrest when the armrest is in the latched position relative to the frame. The bumper includes a base that extends from a first end to a second end. The base includes a front surface. A stop extends from the front surface of the base. The stop limits rotation of the armrest in an upwardly direction relative to the frame. A first cushion and a second cushion extend from the front surface of the base. The first cushion and the second cushion are compressed when the armrest is in the latched position. The first cushion and the second cushion bias the armrest in a downwardly direction relative to the frame. The first cushion and the second cushion extend a greater distance from the base than the stop.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 1:
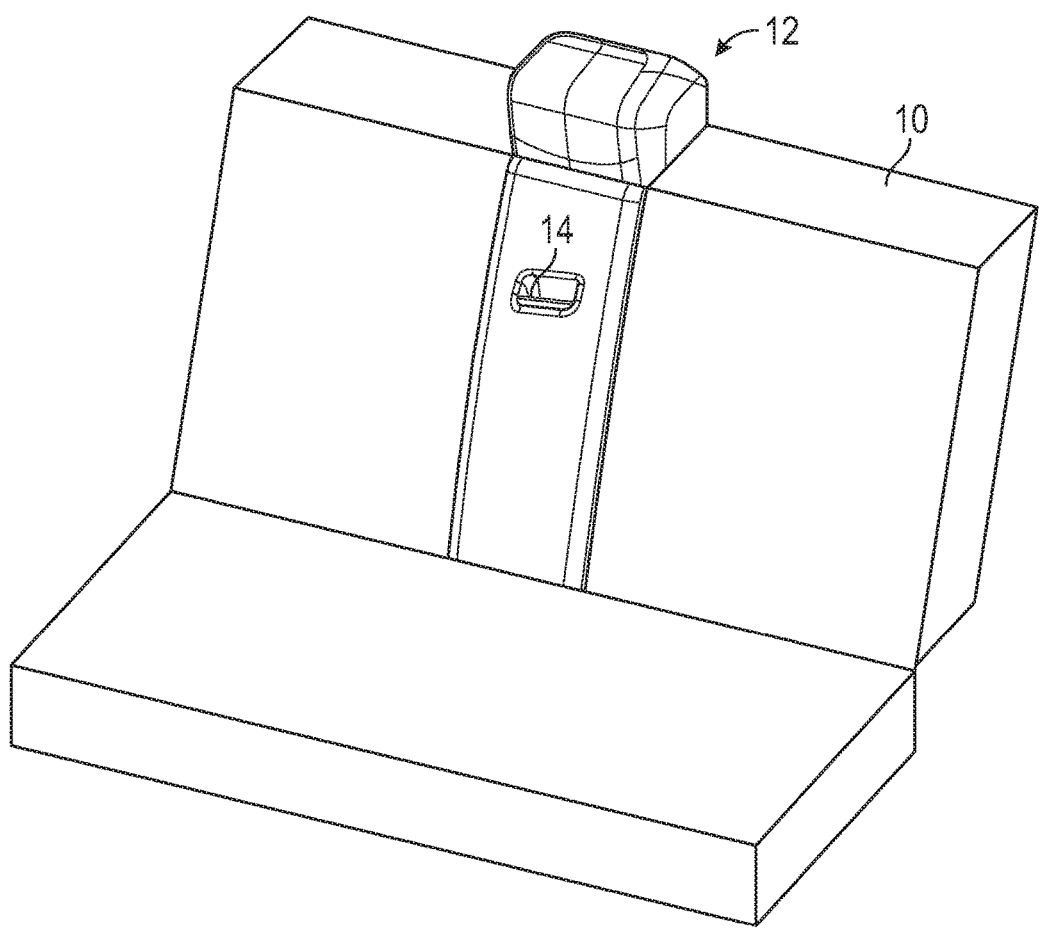
FIG. 1 is a perspective view of a bench-type vehicle seat including an armrest assembly having an improved structure for an anti-rattle bumper in accordance with this invention.

Referring now to the drawings, there is illustrated in FIG. 1 a bench-type vehicle seat 10 that includes a center armrest assembly, indicated generally at 12, in accordance with this invention. The illustrated bench-type vehicle seat 10 is, in large measure, conventional in the art and is intended merely to illustrate one environment in which this invention may be used. Thus, the scope of this invention is not intended to be limited for use with the specific structure for the bench-type vehicle seat 10 illustrated in FIG. 1. On the contrary, as will become apparent below, this invention may be used in any desired environment for the purposes described below.

In FIG. 1, the armrest assembly 12 is shown in a raised storage position relative to the seat 10. As a result, the seat 10 is configured to accommodate three occupants thereon. In a manner that is well known in the art, the armrest assembly 12 may be pivoted downwardly relative to the seat 10 from the raised storage position to a lowered use position (not shown). As a result, the seat 10 is configured to accommodate two occupants thereon, with the armrest assembly 12 extending between them. A latch (not shown in FIG. 1) is provided to retain the armrest assembly 12 in the raised storage position. The armrest assembly 12 includes a release handle 14 that is operable to selectively release the latch and allow the armrest assembly 12 to be moved from the raised storage position to the lowered use position when desired.

Figure 2:
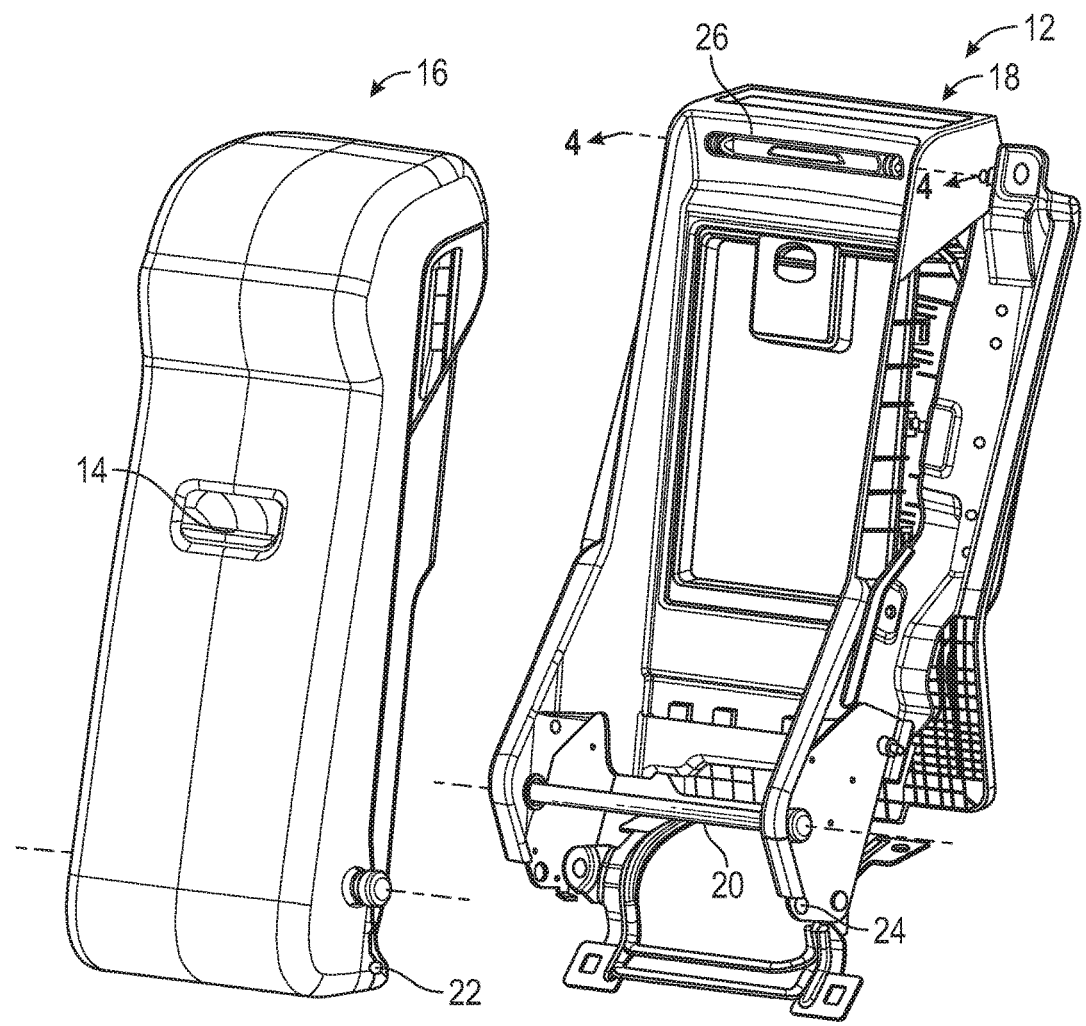
FIG. 2 is an enlarged exploded perspective view of an armrest and a frame of the armrest assembly illustrated in FIG. 1.

As shown in FIG. 2, the armrest assembly 12 includes an armrest, indicated generally at 16, and a frame, indicated generally at 18. The frame 18 may be fixed relative to the seat 10 and may be formed as either an integral part of a frame for the seat 10 or be mounted to some other portion of the vehicle. The armrest assembly 12 is supported on an axle 20 of the frame 18 for selective movement between the lowered use position and the raised storage position. The armrest assembly 12 includes a retractable catch 22 that is biased outwardly from the armrest assembly 12. When the armrest assembly 12 is in the raised storage position shown in FIG. 1, the catch 22 extends into a catch opening 24 provided on the frame 18. Thus, the catch 22 engages the frame 18 and prevents movement of the armrest assembly 12 relative to the frame 18. The release handle 14 may be operated to retract the catch 22 from the catch opening 24, thereby allowing the armrest assembly 12 to be moved relative to the frame 18 from the raised storage position to the lowered use position. Subsequently, the armrest assembly 12 may again be moved from the lowered use position to the raised storage position, and the catch 22 will again extend into the catch opening 24 to prevent further movement of the armrest assembly 12 relative to the frame 18.

In order to prevent the armrest assembly 12 from moving relative to the frame 18 when the armrest assembly 12 is in the raised storage position, a bumper 26 is provided on the armrest assembly 12. The structure of the bumper 26 is more clearly illustrated in FIGS. 3 through 6. As shown therein, the bumper 26 is positioned between the armrest assembly 12 and the frame 18 such that when the armrest assembly 12 is in the raised storage position, the bumper 26 engages both the armrest assembly 12 and the frame 18 to prevent or minimize relative movement therebetween.

As shown in FIGS. 3 through 6, the bumper 26 includes a base portion 28 that is made of a resilient material, such as rubber. However, the base portion 28 may be made of any desired material. The base portion 28 extends from a first end 30 to a second end 32. The base portion 28 includes a stop 34 that extends from a front surface 36 of the bumper 26. The stop 34 is located in the center of the base portion 28, an equal distance from the first end 30 and the second end 32. However, the stop 34 may be located in any other desired position on the base portion 28. The stop 34 is made of the same material as the base portion 28 and is molded as an integral part of the base portion 28. However, the stop 34 may be a separate component if desired, and may be made of any desired material.

The base portion 28 of the bumper 26 also includes a first cushion 38 and a second cushion 40 that extend from the front surface 36 of the bumper 26. The cushions 38 and 40 extend a greater distance from the front surface 36 of the base portion 28 than does the stop 34. The first cushion 38 is located adjacent to the first end 30 of the base portion 28, while the second cushion 40 is located adjacent to the second end 32 of the base portion 28. However, the first cushion 38 and the second cushion 40 may be located at other desired positions on the base portion 28. Additionally, the base portion 28 may include more or fewer than the two cushions 38 and 40 illustrated. The cushions 38 and 40 are made of the same material as the base portion 28 and are integrally molded as part of the base portion 28. However, the cushions 38 and 40 may be separate components if desired, and may be made of any desired material. The illustrated cushions 38 and 40 are mirror images of each other and, thus, only the structure of the cushion 40 will be described in detail below. However, the cushions 38 and 40 may have different features from each other if desired.

The bumper 26 further includes retainers 42 that extend from a rear surface 41 of the bumper 26 that is opposite the front surface 36. As will be described below, the retainers 42 function to hold the bumper 26 in position on the frame 18. The illustrated retainers 42 are resilient clips, but any desired retainer may be used. The illustrated bumper 26 includes four retainers 42, but any desired number of retainers may be used. The illustrated retainers 42 are made of a resilient plastic material that is harder than the material used to make the base portion 28. However, the retainers 42 may be made of any desired material and may be made of the same material as the base 28, if desired. The manner of operation of the retainers 42 will be described below.

Figure 4:
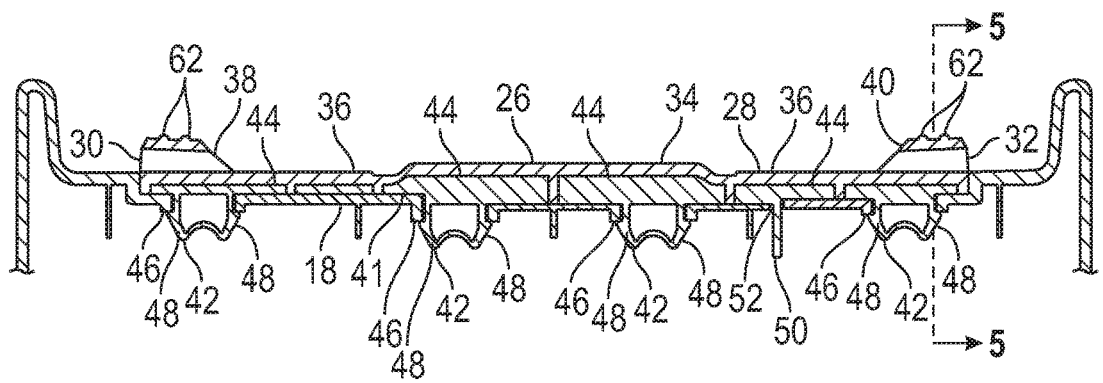
FIG. 4 is a cross-sectional view of the bumper taken along line 4-4 of FIG. 3 including a portion of the frame of the armrest assembly illustrated in FIG. 2.
Figure 5:
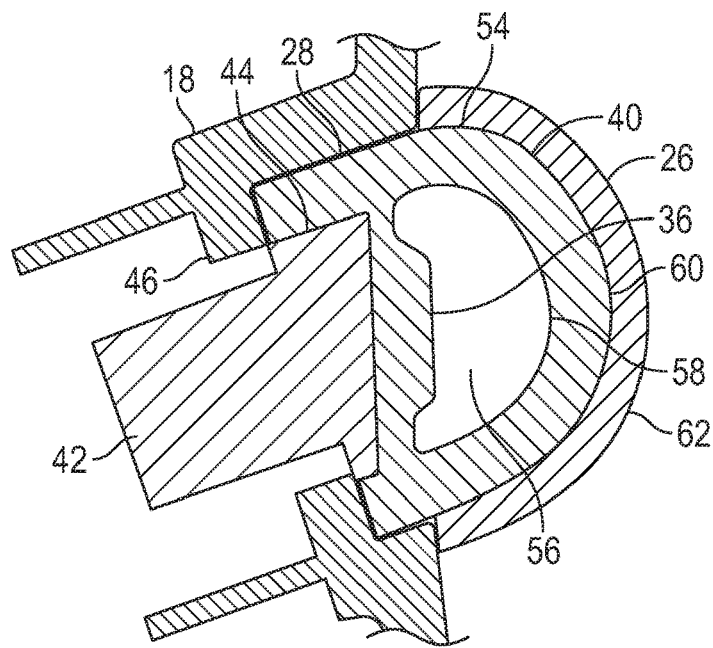
FIG. 5 is a cross-sectional view of the bumper taken along line 5-5 of FIG. 4 showing the armrest assembly in a lowered use position.
Figure 6:
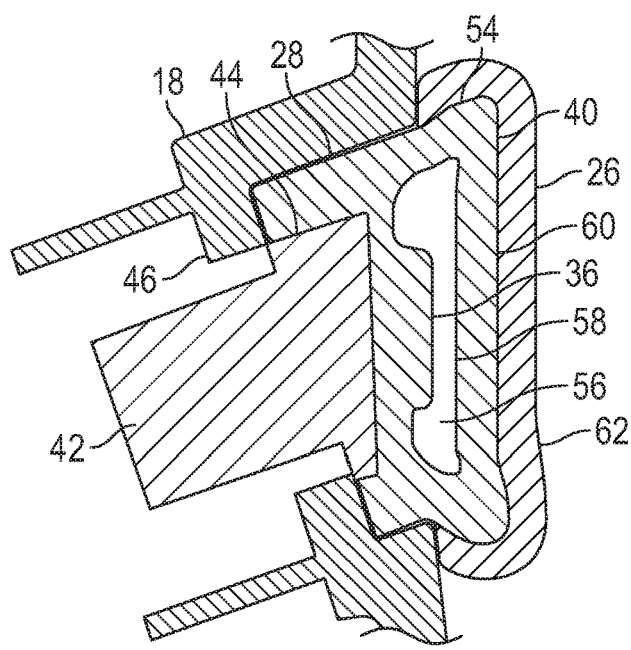
FIG. 6 is a cross-sectional view similar to FIG. 5 showing the armrest assembly in a raised storage position.

As best shown in FIGS. 4 through 6, the retainers 42 are formed integrally with a retainer portion 44 of the bumper 26. The illustrated retainer portion 44 is made of the same material as the retainers 42, and each retainer 42 is molded as an integral part of the retainer portion 44. The illustrated bumper 26 includes a single retainer portion 44 that all the retainers 42 extend from, but may include multiple retainer portions 44 if desired. Additionally, the retainer portion 44 and the retainers 42 may be separate components if desired and may be made of any desired material. In the illustrated embodiment, the base portion 28, the stop 34, the first cushion 38, and the second cushion 40 are molded as an integral part. However, the bumper 26 may be assembled in any desired fashion.

The bumper 26 is installed on the frame 18 of the armrest assembly 12 by inserting the retainers 42 into respective retainer openings 46 provided on the frame 18. As best shown in FIG. 4, the frame 18 includes four retainer openings 46, which are holes in a portion of the frame 18. Each retainer 42 includes two opposed arms 48 that initially engage the frame 18 and are elastically deflected inwardly toward each other. Once the retainer 42 is fully inserted into the respective retainer opening 46, the arms 48 rebound outwardly away from each other and engage the sides of the retainer opening 46 in order to retain the bumper 26 in position on the frame 18. The bumper 26 includes an optional guide 50 that extends from the back side 41 of the bumper 26. The illustrated guide 50 is a molded component that is made of the same material as the retainer portion 44, but may be made of any desired material and may be made in any desired fashion. The guide 50 is inserted into a guide hole 52 on the frame 18. It should be appreciated that the guide 50 will not align with the guide hole 52 and will interfere with the bumper 26 being placed against the frame 18 if the bumper 26 is not properly positioned relative to the frame 18 during installation.

Referring now to FIGS. 5 and 6, cross-sectional views of the cushion 40 are shown. FIG. 5 shows the cushion 40 when the armrest assembly in the lowered use position, while FIG. 6 shows the cushion 40 when the armrest assembly in the raised storage position. The cushion 40 includes a cushion arc 54 that extends from the base portion 28 of the bumper 26. The cushion arc 54 is connected to the base portion 28 at two ends, and an internal space 56 is defined between the cushion arc 54 and the base portion 28. The cushion arc 54 includes an internal surface 58 that faces the internal space 56 and an external surface 60 that faces away from the internal space 56. The cushion 40 also includes a surface texture 62 on the external surface 60 of the cushion arc 54. The illustrated surface texture 62, best seen in FIG. 3, includes two raised ridges on the cushion 40. However, the surface texture 62 may be any desired feature. The illustrated surface texture 62 is made of the same material as the cushion arc 54 and is molded as part of the cushion arc 54. However, the surface texture 62 may be a separate component if desired may be made of any desired material and by any desired fashion.

FIG. 6 illustrates the cushion 40 when the armrest assembly 12 is in the raised storage position (the armrest assembly 12 is not shown in FIG. 6 so that the features of the cushion 40 may be more clearly seen). As previously described, the bumper 26 is positioned between the armrest assembly 12 and the frame 18 such that when the armrest assembly 12 is moved to the raised storage position, the armrest assembly 12 engages the bumper 26. As best appreciated in reference to FIG. 4, when the armrest assembly 12 is moved toward the raised storage position, the armrest assembly 12 will initially engage the first cushion 38 and the second cushion 40 of the bumper 26. In the illustrated embodiment, the armrest assembly 12 will initially engage the surface textures 62 provided on the first cushion 38 and the second cushion 40. As the armrest assembly 12 is further moved, it will apply forces on the first cushion 38 and the second cushion 40. As best understood in reference to FIGS. 5 and 6, these forces will cause the respective cushion arcs 54 to elastically deform toward the base portion 28 of the bumper 26. The force applied to the cushions 38 and 40 will impede the movement of the armrest assembly 12 relative to the frame 18, but the occupant of the vehicle will be able to continue to move the armrest assembly 12 toward the raised storage position.

Figure 3:
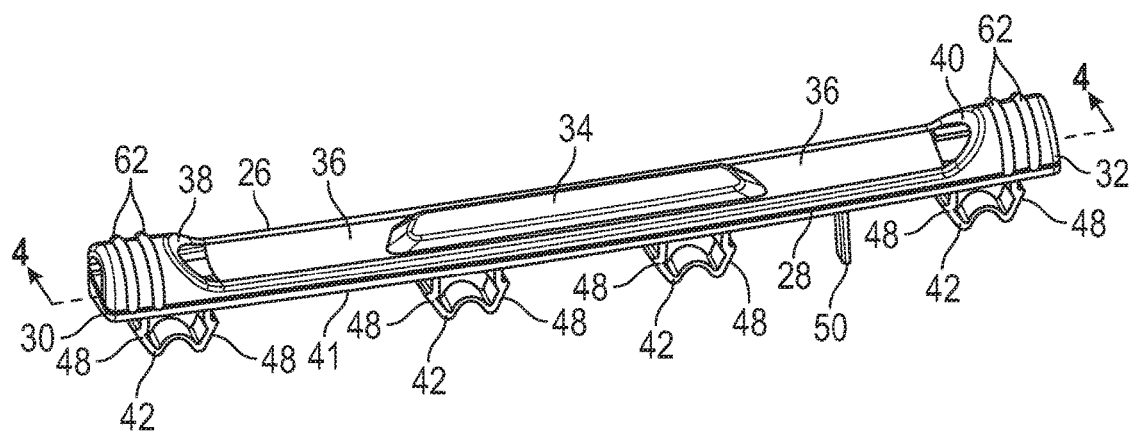
FIG. 3 is a further enlarged perspective view of a bumper of the armrest assembly illustrated in FIG. 1.

As best understood in reference to FIGS. 3 and 5, further movement of the armrest assembly 12 will cause the armrest assembly 12 to engage the stop 34 on the bumper 26. As previously described, the stop 34 is made of resilient material, but the stop 34 is not as resilient as the cushions 38 and 40. The stop 34 includes a layer of resilient material over the relatively harder retainer portion 44 and is, therefore, less able to deflect than the cushions 38 and 40. Referring back to FIG. 6, as the cushion 40 is compressed by the armrest assembly 12, the internal surface 58 on the cushion arc 54 is moved toward the front surface 36 of the bumper 26, and the size and shape of the internal space 56 are deformed. FIG. 6 illustrates the cushion 40 when the armrest assembly 12 has engaged the stop 34 and is prevented from further movement relative to the frame 18 toward the raised storage position.

In the illustrated embodiment, the internal surface 58 does not engage the front surface 36, and an internal space 56 remains between the base 28 and the cushion arc 54. When the occupant stops applying a force to the armrest assembly 12, the elastic force of the cushion arc 54 will cause it to rebound from the state shown in FIG. 6 to the state shown in FIG. 5. This rebound force will be applied by the cushion 40 to the armrest assembly 12. Thus, the bumper 26 applies a force on the armrest assembly 12, urging it to move relative to the frame 18 from the raised storage position to the lowered use position. As previously described, when the armrest assembly 12 is in the latched position, the catch 22 is located in the catch opening 24 to prevent rotation of the armrest assembly 12 relative to the frame 18. Therefore, the force applied to the armrest assembly 12 by the bumper 26 will not be able to push the armrest assembly 12 out of the raised storage position. However, the force applied to the armrest assembly 12 by the bumper 26 is able to move the armrest assembly 12 far enough to cause the catch 22 to engage a wall of the catch opening 24. Thus, the catch opening 24 may be larger than the catch 22, but the armrest assembly 12 will still be secured relative to the frame 18 when the armrest assembly 12 is in the latched position.

Referring back to FIG. 1, when the occupant desires to move the armrest assembly 12 from the raised storage position to the lowered use position, the occupant operates the release handle 14. As previously described, this allows the armrest assembly 12 to move relative to the seat 10. As the armrest assembly 12 is moved, it will no longer engage the bumper 26. Referring back to FIG. 6, when the armrest assembly 12 disengages from the bumper 26, it will pull away from the cushion 40. The surface texture 62 is provided to reduce the contact area between the armrest assembly 12 and the cushion 40 in order to reduce any adhesive forces between the armrest assembly 12 and the cushion 40. Additionally, the internal space 56 is maintained between the front surface 36 of the base 28 and the internal surface 58 of the cushion arc 54 in order to avoid any adhesive forces from forming between the front surface 36 and the internal surface 58 when the armrest assembly 12 is in the raised storage position. This allows the cushion 40 to more easily rebound to the state illustrated in FIG. 5.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A bumper for a vehicle armrest assembly comprising:
   a base including a front surface and a rear surface that is opposite to the front surface;
   a stop that extends from the front surface of the base;
   a cushion that extends from the front surface of the base a greater distance from the front surface of the base than the stop; and
   a retainer that extends from a rear side of the base and is made of a material that is harder than the base.

2. The bumper for a vehicle armrest assembly of claim 1, wherein the cushion is a first cushion, and further including a second cushion that extends from the front surface of the base, and wherein the stop is located between the first cushion and the second cushion.

3. The bumper for a vehicle armrest assembly of claim 1, wherein the cushion includes a cushion arc that extends from the base, and wherein an internal space is defined between the cushion arc and the base.

4. The bumper for a vehicle armrest assembly of claim 3, further including a surface texture on an external surface of the cushion arc.

5. The bumper for a vehicle armrest assembly of claim 4, wherein the surface texture includes a raised ridge on the external surface of the cushion arc.

6. An armrest assembly comprising:
   a frame;
   an armrest mounted to the frame for relative rotational movement;
   a latch adapted so that when the armrest is in a storage position relative to the frame, the latch retains the armrest against movement relative to the frame; and
   a bumper that engages the armrest and the frame when the armrest is in the latched position relative to the frame, the bumper including a stop that limits rotation of the armrest in a first direction relative to the frame and a cushion that biases the armrest in a second direction relative to the frame.

7. The armrest assembly of claim 6, wherein the bumper includes a cushion that is compressed when the armrest is in the latched position.

8. The armrest assembly of claim 6, wherein the bumper includes a base that extends from a first end to a second end, the base including a front surface, the stop extends from the front surface and the cushion extends from the front surface, wherein the cushion extends a greater distance from the base than the stop.

9. The armrest assembly of claim 8, wherein the cushion is a first cushion, and further including a second cushion that extends from the front surface of the base, and wherein the stop is located between the first cushion and the second cushion.

10. The armrest assembly of claim 6, wherein the cushion includes a cushion arc that extends from the base, and wherein an internal space is defined between the cushion arc and the base.

11. The armrest assembly of claim 10, further including a surface texture on an external surface of the cushion arc.

12. The armrest assembly of claim 11, wherein the surface texture includes a raised ridge on the external surface of the cushion arc.

13. The armrest assembly of claim 12, further including a retainer that extends from a rear surface of the base that is opposite the front surface.

14. The armrest assembly of claim 13, wherein the retainer is made of a material that is harder than the base.

15. The armrest assembly of claim 10, wherein the cushion arc includes an internal surface and the internal space is defined between the internal surface and the front surface of the base, the cushion arc is elastically deformed when the armrest is in the latched position, and the internal space remains apart from the front surface when the armrest is in the latched position.

16. The armrest assembly of claim 15, wherein the armrest engages the stop when the armrest is in the latched position.

17. The armrest assembly of claim 16, wherein the bumper includes a retainer that extends from a rear surface of the base that is opposite the front surface and engages one of the armrest and the frame.

18. An armrest assembly comprising:
a frame;
an armrest mounted to the frame for relative rotational movement;
a latch adapted so that when the armrest is in a latched position relative to the frame, the latch retains the armrest against movement relative to the frame; and
a bumper mounted on the frame that engages the armrest when the armrest is in the latched position relative to the frame, the bumper including a base that extends from a first end to a second end, the base including a front surface, a stop that extends from the front surface of the base and limits rotation of the armrest in a first direction relative to the frame, and a first cushion and a second cushion that extend from the front surface of the base, are compressed when the armrest is in the latched position, and bias the armrest in a second direction relative to the frame, wherein the first cushion and the second cushion extend a greater distance from the base than the stop.

* * * * *